(12) United States Patent
Rincon et al.

(10) Patent No.: US 9,374,446 B2
(45) Date of Patent: Jun. 21, 2016

(54) WEB PLATFORM WITH SELECT-TO-CALL FUNCTIONALITY

(71) Applicant: Microsoft Corporation, Redmond, WA (US)

(72) Inventors: Lilian Dearith Rincon, San Carlos, CA (US); Alok Khanna, Mountain View, CA (US); Jaanus Soots, Tallinn (EE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/895,077

(22) Filed: May 15, 2013

(65) Prior Publication Data

US 2014/0341371 A1 Nov. 20, 2014

(51) Int. Cl.
*H04M 3/00* (2006.01)
*H04M 1/2745* (2006.01)
*G06F 17/22* (2006.01)
*G06F 17/30* (2006.01)
*H04M 7/00* (2006.01)

(52) U.S. Cl.
CPC ....... *H04M 1/27455* (2013.01); *G06F 17/2235* (2013.01); *G06F 17/3089* (2013.01); *H04M 7/003* (2013.01)

(58) Field of Classification Search
CPC . H04M 7/003; H04M 1/575; H04M 2250/60; H04M 3/5191; H04M 3/42042; H04M 7/006; H04M 1/57; H04M 3/4878; H04M 3/4931; H04L 12/66; H04L 29/06027
USPC ............... 379/355.04, 93.23, 201.01, 142.06, 379/114.13, 265.09
See application file for complete search history.

(56) References Cited

U.S. PATENT DOCUMENTS

| | | | |
|---|---|---|---|
| 7,746,990 B1 * | 6/2010 | Fabbrizio | H04M 7/003 379/114.13 |
| 8,041,765 B1 | 10/2011 | Krishnaswamy et al. | |
| 8,081,744 B2 | 12/2011 | Sylvain | |
| 8,184,797 B1 | 5/2012 | Rosen | |
| 8,208,895 B2 | 6/2012 | Wieczorek | |
| 8,358,766 B1 | 1/2013 | Denenberg | |

(Continued)

FOREIGN PATENT DOCUMENTS

| | | |
|---|---|---|
| CN | 101355615 | 1/2009 |
| EP | 1940137 | 7/2008 |
| WO | WO-2010127992 | 11/2010 |

OTHER PUBLICATIONS

"8x8 Virtual Office", Retrieved from <http://www.8x8.com/CommunicationsSolutions/ByProduct/VirtualOffice/Features/webdialer.aspx> on Apr. 9, 2013, (May 12, 2012), 2 pages.

(Continued)

*Primary Examiner* — Akelaw Teshale
(74) *Attorney, Agent, or Firm* — Danielle Johnston-Holmes; Micky Minhas

(57) ABSTRACT

Web content is formatted to show an icon adjacent identified phone numbers to enable select-to-call, e.g., click-to-call functionality from within a web platform. The web platform can include various web browsers, web applications, and the like. The select-to call functionality can comprise an integral part of the web platform, such as comprising part of the web platform's binary. Alternately, the select-to call functionality can be provided through a web plug-in that is downloaded and incorporated into the web platform. The select-to-call functionality can enable the user's web platform context to be maintained during the call.

20 Claims, 11 Drawing Sheets

(56) References Cited

U.S. PATENT DOCUMENTS

| | | | |
|---|---|---|---|
| 8,666,822 B1* | 3/2014 | Kaliss | G06Q 30/0276 705/14.73 |
| 2003/0159109 A1 | 8/2003 | Rossmann et al. | |
| 2004/0122951 A1* | 6/2004 | Beck | G06F 17/30887 709/227 |
| 2005/0097189 A1* | 5/2005 | Kashi | G06F 9/543 709/217 |
| 2007/0274510 A1 | 11/2007 | Kalmstrom | |
| 2008/0080691 A1* | 4/2008 | Dolan | H04M 3/42195 379/201.01 |
| 2008/0147771 A1 | 6/2008 | Bertolino | |
| 2009/0216748 A1 | 8/2009 | Kravcik | |
| 2010/0222036 A1 | 9/2010 | Wormald et al. | |
| 2010/0254524 A1 | 10/2010 | Kim et al. | |
| 2010/0287301 A1 | 11/2010 | Kalmstrom et al. | |
| 2011/0053567 A1* | 3/2011 | Ure | H04M 1/27455 455/414.1 |
| 2011/0196750 A1 | 8/2011 | Hamill | |
| 2011/0310891 A1* | 12/2011 | Howe | G06Q 30/00 370/352 |
| 2012/0015627 A1 | 1/2012 | Band et al. | |
| 2012/0027190 A1 | 2/2012 | Kim et al. | |
| 2012/0258769 A1* | 10/2012 | Nagatomo | 455/550.1 |
| 2012/0307993 A1 | 12/2012 | Masters | |
| 2013/0054749 A1 | 2/2013 | Yao et al. | |
| 2013/0073395 A1 | 3/2013 | Rincon | |
| 2014/0342707 A1 | 11/2014 | Rincon et al. | |

OTHER PUBLICATIONS

"Click to Call for Google Chrome™", Retrieved from <http://www.junctionnetworks.com/knowledgebase/onsip/api-and-web-services/click-to-call-for-google-chrome> on Apr. 9, 2013, (Feb. 15, 2012), 4 Pages.

"Skype Click to Call", Retrieved from <http://www.skype.com/en/download-skype/click-to-call/> on Apr. 9, 2013, (2013), 3 pages.

"Skype Click to Call", Retrieved from <https://support.skype.com/en/faq/FA657/how-do-i-use-skype-click-to-call> on Apr. 9, 2013, (2013), 10 pages.

"Web Browser Click to Call Plugin for Internet Explorer", Retrieved from <http://www.aptela.com/kb4/idx.php/12/323/Calling/article/Web-Browser-Click-to-Call-Plugin-for-Internet-Explorer.html> on Apr. 9, 2013, (May 8, 2011), 3 pages.

Frost, Brad "A tel Tale Sign", Retrieved from <http://bradfrostweb.com/blog/mobile/a-tel-tale-sign/> on Apr. 9, 2013, (Jan. 10, 2012), 13 pages.

Johnson, Miles "Go Mobile! Series: Introducing Click-to-call Phone Numbers in Local Ads on Mobile Devices", Retrieved from <http://adwords.blogspot.in/2010/01/introducing-click-to-call-phone-numbers.html> on Apr. 9, 2013, (Jan. 28, 2010), 2 pages.

Pash, Adam "Click to Call Dials Calls from Your Browser", Retrieved from <http://lifehacker.com/399302/click-to-call-dials-calls-from-your-browser> Apr. 9, 2013, (Jul. 28, 2008), 2 pages.

"International Search Report and Written Opinion", Application No. PCT/US2014/038043, Sep. 23, 2014, 12 Pages.

"International Search Report and Written Opinion", Application No. PCT/US2014/038042, Sep. 9, 2014, 13 Pages.

"Non-Final Office Action", U.S. Appl. No. 13/895,121, Jul. 1, 2015, 6 pages.

"Second Written Opinion", Application No. PCT/US2014/038043, Jun. 12, 2015, 7 pages.

"Second Written Opinion", Application No. PCT/US2014/038042, Jun. 12, 2015, 8 Pages.

Barth, "HTTP State Management Mechanism", Available at: https://datatracker.ietf.org/doc/rfc6265/?include_text=1, Apr. 30, 2011, 37 pages.

"International Preliminary Report on Patentability", Application No. PCT/US2014/038043, Sep. 21, 2015, 8 pages.

"Final Office Action", U.S. Appl. No. 13/895,121, Dec. 23, 2015, 8 pages.

"Non-Final Office Action", U.S. Appl. No. 13/895,121, May 18, 2016, 10 pages.

* cited by examiner

WEB PLATFORM WITH SELECT-TO-CALL FUNCTIONALITY

BACKGROUND

When a user employs a web platform, such as a web browser or web application, to consume web content, they can be presented with various information that may be of interest to them. One such piece of information can comprise a telephone number, such as a landline to a business or other entity. If the user wishes to place a telephone call, they can either leave the web platform and place the call on a telephone or cell phone, or they can launch a separate application to place a peer-to-peer call over a suitably-configured network. Choosing the latter, the user's context is switched entirely from the web content to an entirely different application.

SUMMARY

This Summary is provided to introduce a selection of concepts in a simplified form that are further described below in the Detailed Description. This Summary is not intended to identify key features or essential features of the claimed subject matter.

In one or more embodiments, web content is formatted to show an icon adjacent identified phone numbers to enable select-to-call, e.g., click-to-call functionality from within a web platform. The web platform can include various web browsers, web applications, and the like. The select-to call functionality can comprise an integral part of the web platform, such as comprising part of the web platform's binary. Alternately, the select-to-call functionality can be provided through a web plug-in that is downloaded and incorporated into the web platform. The select-to-call functionality can enable the user's web platform context to be maintained during the call.

In at least some embodiments, details associated with the phone number that is called using the select-to call functionality can be retrieved from a database and surfaced to the user, by way of the web platform, to enrich the user's call experience.

BRIEF DESCRIPTION OF THE DRAWINGS

The detailed description references the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
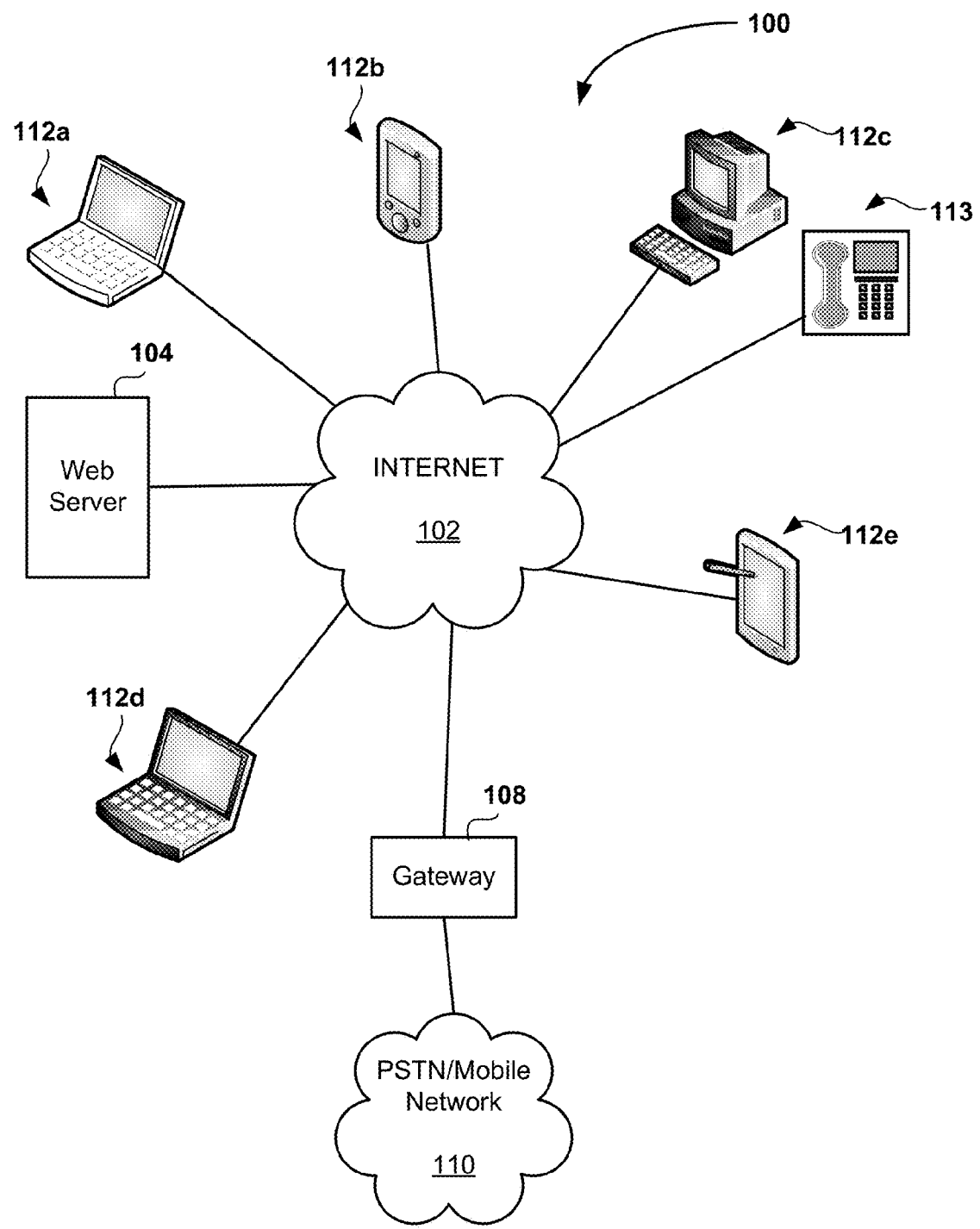
FIG. 1 is an illustration of an environment in an example implementation that is operable to perform the various embodiments described herein.

In one or more embodiments, web content is formatted to show an icon adjacent identified phone numbers to enable select-to-call, e.g., click-to-call functionality from within a web platform. In examples described in this document, the click-to-call terminology will be used. It is to be appreciated and understood, however, that the examples apply equally well to select-to-call scenarios, as will be described in more detail below.

A web platform is a platform that works in connection with content of the web, e.g. public content. A web platform can include and make use of many different types of technologies such as, by way of example and not limitation, URLs, HTTP, REST, HTML, CSS, JavaScript, DOM, and the like. The web platform can also work with a variety of data formats such as XML, JSON, and the like. Web platforms can include web browsers, web applications (i.e. "web apps"), and the like. The select-to-call or click-to-call functionality can comprise an integral part of the web platform, such as comprising part of the web platform's (e.g., web browser's) binary. Alternately, the select-to-call or click-to-call functionality can be provided through a web plug-in that is downloaded and incorporated into the web platform. For example, in response to a user selecting the click-to-call icon, the web plug-in can be downloaded and/or instantiated by way of the web platform to enable the user to place their call. This can occur irrespective of whether the user is already running or has installed a desktop client of a calling application, such as a peer-to-peer (P2P) application such as one offered by Skype. The click-to-call functionality can enable the user's web platform context to be maintained during the call. In the context of this document, a "web platform" is intended to refer to software entities including, by way of example and not limitation, applications such as web browsers, web applications and the like, that are not primarily calling applications such as P2P applications.

In at least some embodiments, details or information associated with the phone number that is called using the click-to-call functionality can be retrieved from a database by way of a reverse number look-up, and surfaced to the user, by way of the web platform, to enrich the user's call experience. For example, if the phone number belongs to a restaurant, a reverse number lookup can be conducted to retrieve information associated with the phone number such as, by way of example and not limitation, a menu, map, rating, reviews, and the like. In this manner, the user's experience can be enhanced by virtue of easily acquiring and accessing information associated with the number. Further, the reverse number lookup can be used to enable the user to place free calls (i.e. calls for which the user is not billed) to various entities.

In the discussion that follows, a section entitled "Example Environment" describes an example environment in which the various embodiments can be utilized. Next, a section entitled "Select-to-Call Functionality" describes aspects of select-to-call functionality in accordance with one or more embodiments. Following this, a section entitled "Call Billing Program" describes a call billing program in accordance with one or more embodiments. Next, a section entitled "Reverse Number Lookup" describes how reverse number lookups can be conducted in accordance with one or more embodiments. Last, a section entitled "Example System" describes an example system and various devices that can be utilized to implement one or more embodiments.

Consider now an example environment in which various embodiments can be practiced.

Example Environment

FIG. 1 is a schematic illustration of a communication system 100 in accordance with one or more embodiments. The communication system 100 includes at least a packet-based network such as the Internet 102, which comprises one or more of a plurality of interconnected elements such as a laptop computer 112a, 112d, a mobile phone 112b, a desktop computer 112c, a tablet computer 112e and a Web server 104. A telephony gateway 108 may also be included to route telephone calls to Public Switched Telephone Network (PSTN) or mobile network 110. At least some of network elements are inter-coupled with the rest of the Internet 102, and is configured to communicate data with other such elements over the Internet by transmitting and receiving data in the form of Internet Protocol (IP) packets. Each element that is coupled to the Internet 102 also has an associated IP address locating it within the Internet. It is to be appreciated that elements other than the elements shown explicitly in FIG. 1, may be coupled to the Internet 102. For example, a peer-to-peer (P2P) server may be included in the communication system 100. Other end-user terminals (e.g., laptop computers, desktop computers, smart phones, tablet computers, etc.), servers and gateways, as well as routers of Internet service providers (ISPs) and Internet backbone routers, etc. may also be included in the communication system 100.

In one embodiment, each of the end-user terminals can include a web platform, such as a web browser and, in addition, communication software comprising a P2P client application, which may also include features for calling phone numbers from the end-user terminal.

When executed, the web browser allows the end-user terminals 112a-e to retrieve web content such as electronic documents in the form of webpages (or other forms of electronic documents, such as a document file, XML file, PDF file, XLS file, etc.) from the Web server 104 and display them on their associated screens. It should be noted that end user terminals 112a-e could be any computing device that is capable of displaying Web pages/documents and connect to the Internet 102.

In one or more embodiments, web content is formatted to show an icon adjacent identified phone numbers to enable click-to-call functionality from within the web platform. As noted above, the web platform can include various web browsers, web applications, and the like. The click-to-call functionality can comprise an integral part of the web platform, such as comprising part of the web platform's binary. Alternately, the click-to-call functionality can be provided through a web plug-in that is downloaded and incorporated into the web platform. The click-to-call functionality can enable calls, such as peer-to-peer calls, to be made as described below. The click-to-call functionality can enable the user's web platform context (e.g., web browser's context) to be maintained and leveraged during the call, as will become apparent below.

In at least some embodiments, details associated with the phone number that is called using the click-to-call functionality can be retrieved from a database and surfaced to the user, by way of the web platform, to enrich the user's call experience, as will be described below in more detail.

When executed, the P2P client application allows the end user terminals (e.g., 112a . . . e) to establish bidirectional communication channels with other such end-user terminals or PSTN phones via the Internet using P2P call set-up (or more generally connection set-up). In one embodiment, the P2P client applications also share presence information with one another, which provides an availability status of users. The presence information for each user can be at least in part defined by the users themselves. To supplement the decentralized call set-up, the P2P client application may retrieve some additional information from a P2P server (not shown), such as contact lists which provide the names of the users' contacts, "avatars" which are images chosen by users to represent themselves within the P2P server.

A Voice Over IP (VoIP) landline phone 113 may also be coupled to the Internet 102 for communication with various other devices.

A P2P client application may also be installed at a gateway 108 coupled to both the Internet 102 and a PSTN network and/or a mobile cellular network 110. This allows the P2P client applications running on the end-user terminals 112a-e to communicate with ordinary land-line telephones and/or mobile telephones respectively, even if those telephones themselves do not run P2P client applications and are not directly coupled to the Internet 102. In that case, the P2P client application on the end user terminals 112a-e sets up a connection over the Internet with the P2P client application on the gateway 108 using P2P call set-up and provides it with a phone number, and the gateway 108 uses the phone number to set up a connection with the telephone over the PSTN or/and mobile network 110.

In one embodiment, if a particular end-user terminal 112a does not have an associated phone number, either the gateway 108 or the P2P server may assign a temporary outgoing identity (aka a caller identification number) prior to setting up a call to a phone number in either the PSTN or mobile network 110. In one embodiment, the temporary phone number may be a random number or preconfigured by the user or by the P2P server.

In one embodiment, a page formatter (not specifically shown), is used by the end user terminals 112a-e to format a document during, prior to or after the document is displayed on the end user terminal display. In one embodiment, the page formatter parses the document (or one or more sections thereof) to find phone numbers in the document and to format the found phone numbers in different ways according to configurations and rules. The phone numbers may also be amended to include or remove some parts to make the phone numbers readily dialable based on the location of the end-user terminal 112a. For example, a country code may be added if it is determined that one of the found numbers in the document is a foreign phone number and the end user terminal 112a is currently located in a different country. In one embodiment, a rules database includes rules and configurations to help the page formatter format the numbers. In an alternative embodiment, an application may be executed in the end user terminal 112a itself to perform some or all functions of the page formatter. For example, a web platform, web browser, browser plug-in and the like may be used to format the document.

Figure 2:
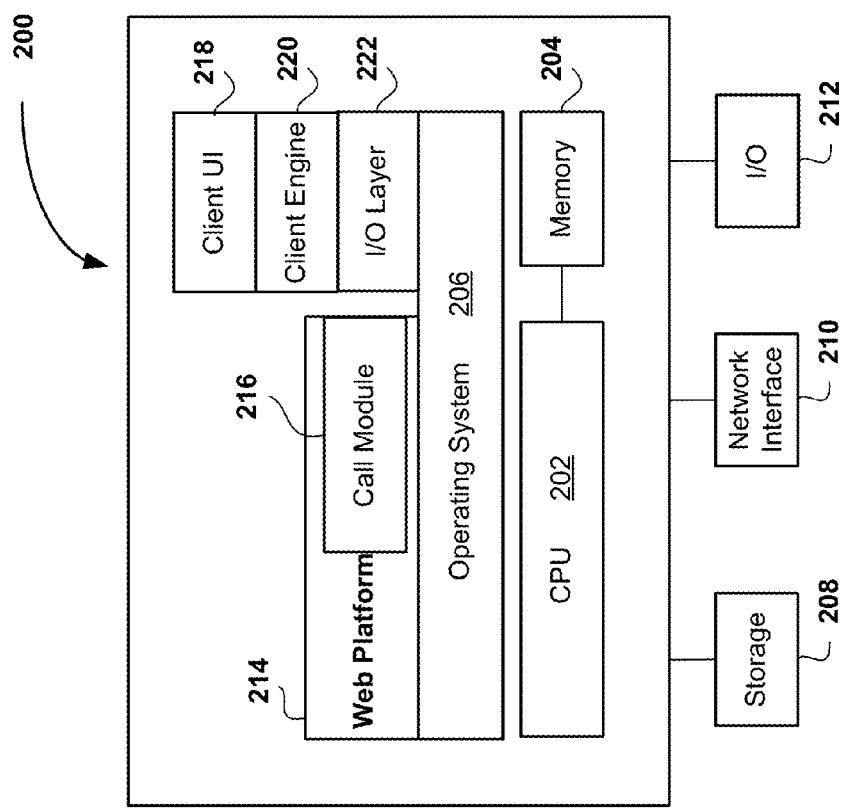
FIG. 2 illustrates an example client architecture in accordance with one or more embodiments.

The schematic block diagram 200 of FIG. 2 shows an example end-user terminal, such as end-user terminal 112a (FIG. 1) which is configured to enable calls to be made from the web platform, as well as to act as a terminal of a P2P system operating over the Internet 102. The end user terminal 112a comprises a CPU 202 operatively coupled to a network interface 210, such as modem for connecting to the Internet 102, a non-volatile storage device 208, such as a hard-drive or flash memory, and a volatile memory device such as a random access memory (RAM) 204. The end-user terminal also comprises one or more user input devices, for example in the form of a keyboard, mouse, microphone and webcam, each operatively coupled to the CPU 202 via an I/O interface 212. The end-user terminal further includes one or more user output devices, for example in the form of a display screen and speaker, again each operatively coupled to the CPU 202. The storage device 208 stores software including at least an operating system (OS) 206 and a web platform 214 which can include a web browser or web application having a call module 216. The call module is configured to enable the web platform or browser to make calls to other end user terminals or land lines as described above and below.

Storage device 208 also stores packet-based communication software comprising a P2P client application that includes a Client UI 218, a Client Engine 220 and an I/O Layer 222. On start-up or reset of the end-user terminal 112a, the operating system software 206 is automatically loaded into the RAM 204 and from there is run by being executed on the CPU 202. Once running, the operating system 206 can then run applications such as the web platform 214 (and call module 216) and P2P client application by loading them into the into the RAM 204 and executing them on the CPU 202.

In one embodiment, the P2P client application comprises three basic layers: an input and output 222, a client engine layer 220, and a user interface (UI) layer 218. The web platform 214, P2P client application and call module 216 are run in the operating system 206. This means that in a multitasking environment they are scheduled for execution by the operating system 206; and further that inputs to the web platform 214 and the I/O layer 222 of the P2P client application from the input devices as well as outputs from the web platform 214 and the I/O layer 222 of the P2P client application to the output devices may be mediated via suitable drivers and/or APIs of the operating system 206.

In one embodiment, the I/O layer 222 of the P2P client application comprises audio and/or video codecs which receive incoming encoded streams and decodes them for output to the speaker (not shown) and/or display (not shown) as appropriate, and which receive un-encoded audio and/or video data from the microphone (not shown) and/or webcam (not shown) and encodes them for transmission as streams to other end-user terminals 112a-e of the communication system 100 (or the P2P system). The I/O layer 222 may also comprises a control signaling protocol for signaling control information between end-user terminals 112a-e of the Internet 102. The client engine 220 then handles the connection management functions of the communication system 100 as discussed above, such as establishing calls or other connections by P2P address look-up and authentication. The client engine 220 may also be responsible for other secondary functions of the communication system such as supplying up-to-date contact lists and/or avatar images of the user to the P2P server within the communication system 100 or retrieving up-to-date contact lists of the user and retrieving up-to-date avatar images of other users from the P2P server. Further, the client engine 220 retrieves presence information from the other clients of the users in the contact list via a public API, and reciprocally provide its own presence information to those other clients that are online, Exchange of presence information directly between clients via a public API is the one option, but alternatively the presence information could be exchanged via an intermediate node such as the P2P server.

The UI layer 218 is responsible for presenting decoded video to the user via the display, for how to arrange the presented output on the display along with user controls such as buttons and menus, and for receiving inputs from the user via the presented controls. The I/O layer 222 of the P2P client application is arranged to be able to interact with the call module 216 and the call module 216 is arranged to be able to interact with the web platform 214, under control of the OS 206.

The call module 216 can be implemented as a plug-in to web platform 214. Alternately, the call module 216 can comprise a native component of the web platform and hence, is not a plug-in. The call module 216 can include all or a subset of the functionality of the P2P client application that permits calls to be made from and within the web platform.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the end user terminal may also include an entity (e.g., software) that causes hardware or virtual machines of the end user terminal to perform operations, e.g., processors, functional blocks, and so on. For example, the end user terminal may include a computer-readable medium that may be configured to maintain instructions that cause the end user terminal, and more particularly the operating system and associated hardware of the end user terminal to perform operations. Thus, the instructions function to configure the operating system and associated hardware to perform the operations and in this way result in transformation of the operating system and associated hardware to perform functions. The instructions may be provided by the computer-readable medium to the end user terminal through a variety of different configurations.

One such configuration of a computer-readable medium is a signal bearing medium and thus is configured to transmit the instructions (e.g., as a carrier wave) to the end user terminal, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Having considered an example operating environment in accordance with one or more embodiments, consider now a discussion of click-to-call functionality in accordance with one or more embodiments.

Select-to-Call Functionality

Figure 3:
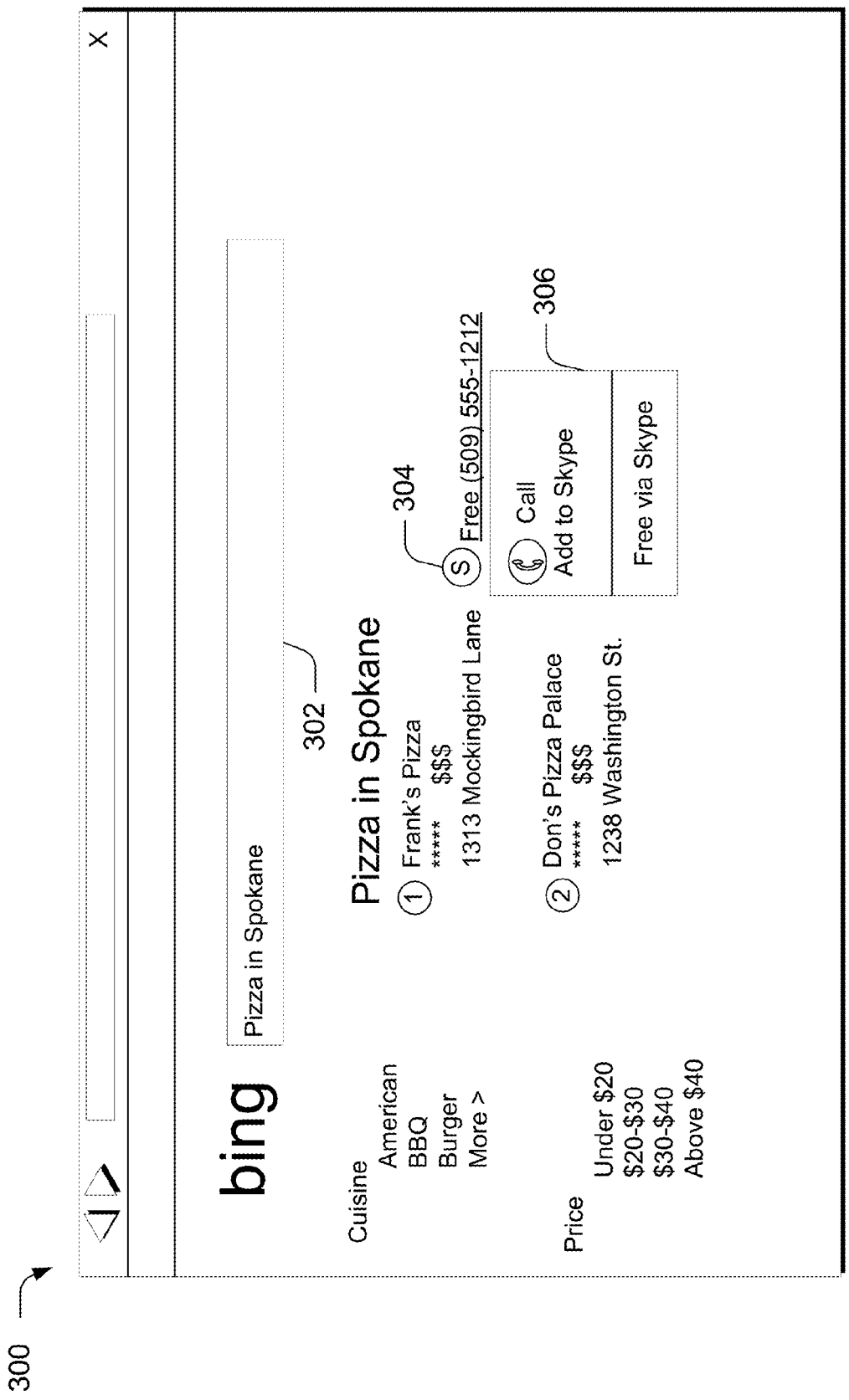
FIG. 3 illustrates an example user interface in accordance with one or more embodiments.

As noted above, web content, such as content that appears on a web page, can be formatted to show an icon adjacent identified phone numbers to enable select-to-call, e.g. click-to-call functionality from within a web platform, such as a web browser. In the example about to be described, a web browser is used as an example web platform. The click-to-call functionality can comprise an integral part of the web browser, such as comprising part of the web browser's binary. Alternately, the click-to-call functionality can be provided through a web plug-in that is downloaded and incorporated into the web browser. The click-to-call functionality can enable the user's web browser context to be maintained during the call. As an example, consider FIG. 3.

There, an example browser user interface, in accordance with one or more embodiments, is shown generally at 300. In this example, the browser user interface includes a search results page for search terms that have been entered in search box 302. The search results can be ranked in any particular order. In at least some embodiments, the search results can be ranked in accordance with whether an entity associated with each search result is currently participating in a call billing program. The call billing program is one in which the recipient of a call, in this case the entity or business, is billed for the cost of a call rather than the caller. This is described in more detail below.

The search results page includes an icon 304 next to phone numbers that have been identified. The icon may or may not be selected to place a call to the identified number. Phone numbers can be identified in any suitable way. For example, phone numbers can be identified within a particular webpage (e.g., by XML tags, HTML tags). Alternately or additionally, phone numbers can be identified by a phone number recognition engine that may or may not comprise part of the browser. The phone number recognition engine employs logic that analyzes text that appears on a webpage to ascertain whether the text is a phone number and if so, which country the phone number is associated with. The logic employed by the phone number recognition engine also conducts formatting checks to ascertain whether the phone number is in the correct format and whether the phone number is, in fact, a valid number. Any suitable type of logic can be utilized to ascertain whether text identified in a webpage is or is not a phone number. Example techniques are described in U.S. Patent Application Publication No. 2007/0274510. In addition, the phone number recognition engine can employ contextual logic to determine if a selected number in a webpage is a phone number, e.g., whether the number appears in a sentence or a block of text that is directed to phone calls or establishing contacts. For example, the number in the sentence "For further information call 202-5551212" is likely to be a phone number because of the context of the sentence. That is, for example, if words such as "call," "contact," etc. appears in the proximity of a number, the number is likely to be a phone number. In another example, based on the contextual information, it can be determined that the first number in the sentence "Total 3745909 students attended California schools in the year 2008" is not a phone number and the second number is also not a phone number because it is too short and the contextual information does not suggest the second number is a phone number.

The icon also appears, in at least some embodiments, in conjunction with a notification that calls to this number that are placed through the web browser are free of charge. In this example, two such notifications are provided, a first of which appearing in line with the telephone number, and a second which appearing in a notification box 306.

Figure 4:
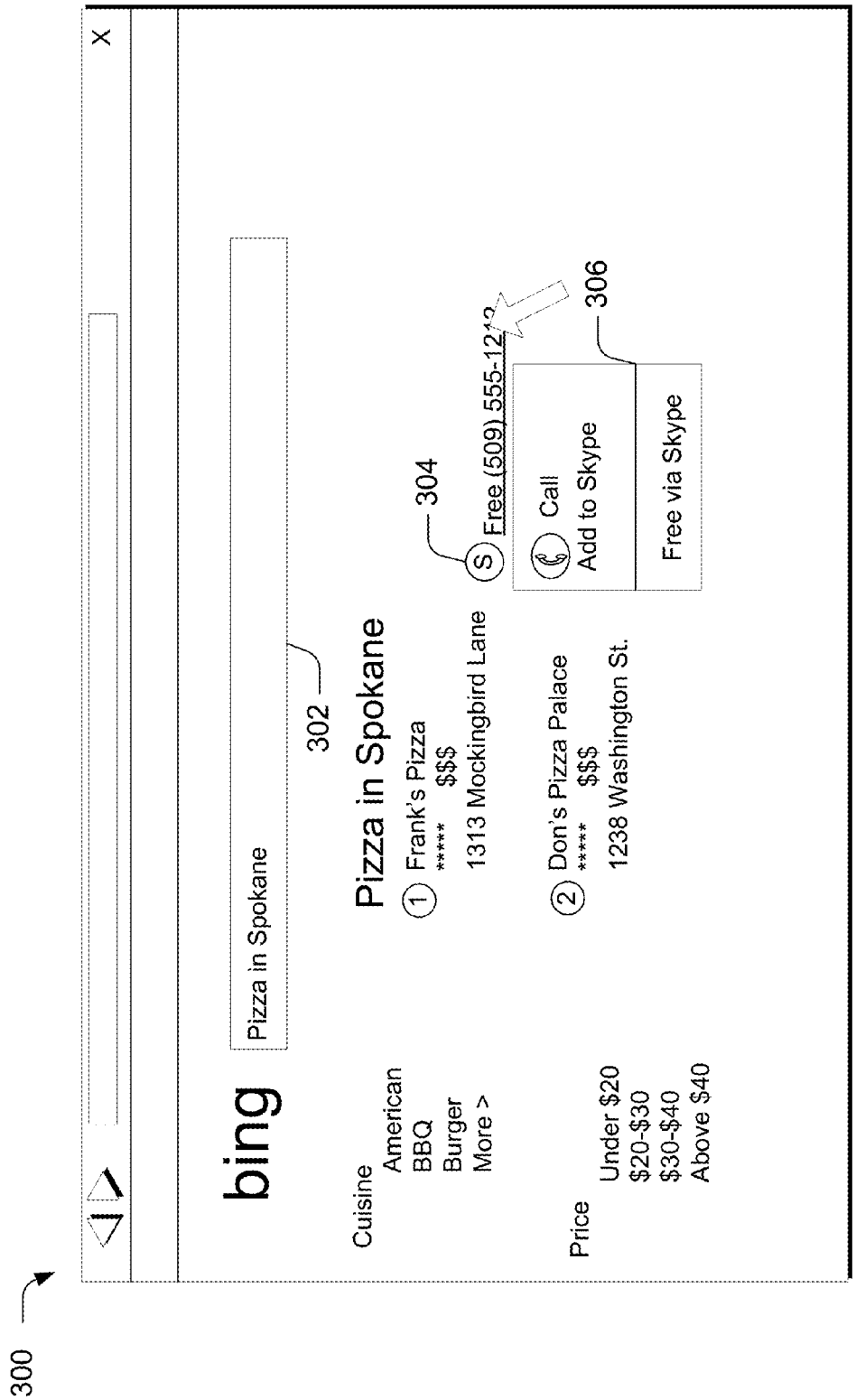
FIG. 4 illustrates an example user interface in accordance with one or more embodiments.

Assume now that the user wishes to place a free call to the number through their web browser. As an example, consider FIG. 4. There, the user has placed their cursor over the telephone number or has otherwise indicated a selection (e.g. a touch selection for touch-enabled devices or a selection through a natural user interface (NUI)) to call that number.

When the web browser receives the click selection, a check can be performed to ascertain whether the web browser includes the click-to-call functionality (also referred to as the call module 216 (FIG. 2)). If the web browser has the click-to-call functionality, then the call can be placed as described in more detail below. If, on the other hand, the web browser does not have the click-to-call functionality, a plug-in that embodies the click-to-call functionality can be downloaded by contacting a suitably-configured Web server.

Figure 5:
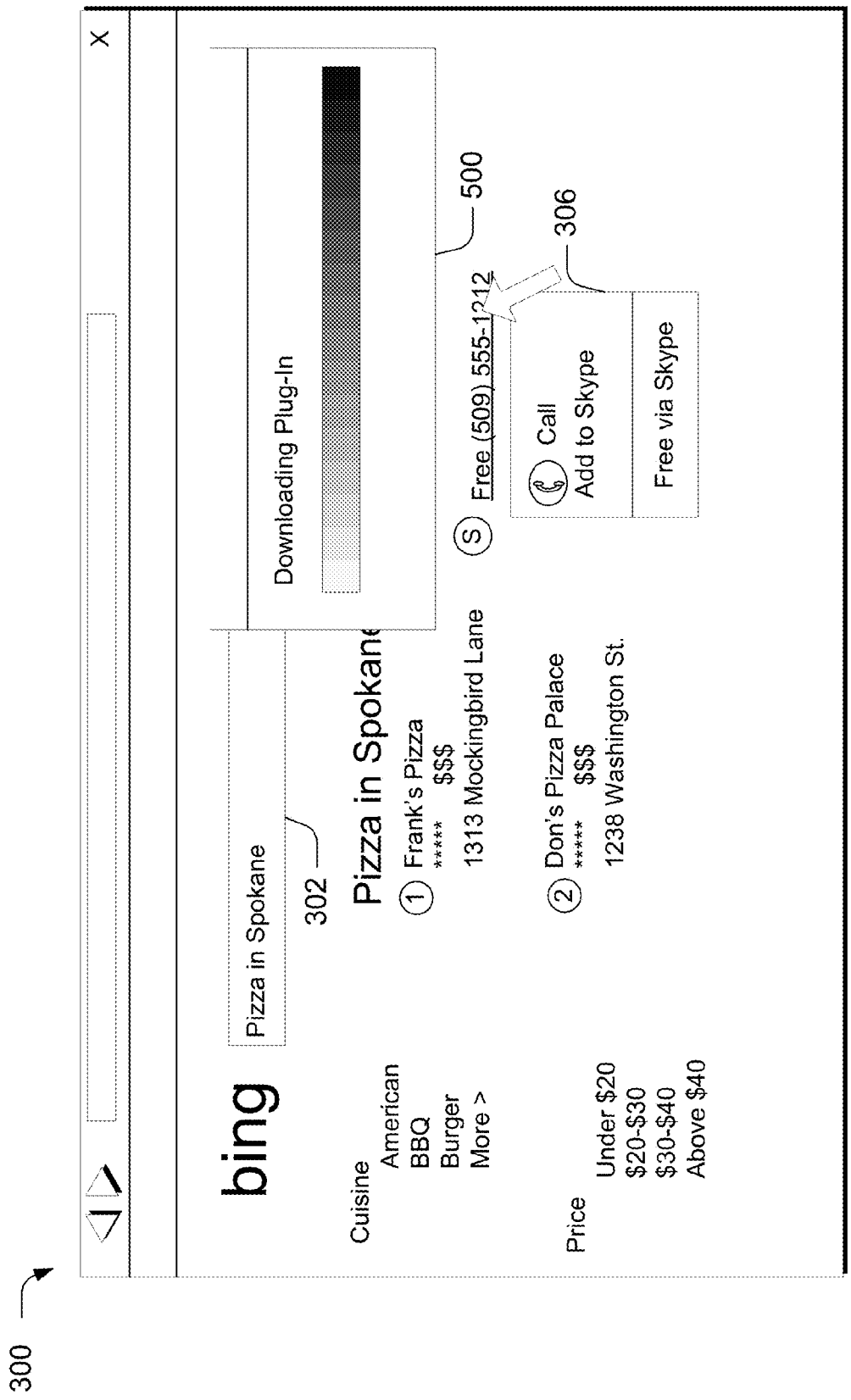
FIG. 5 illustrates an example user interface in accordance with one or more embodiments.

As an example, consider FIG. 5. There, as the plug-in is being downloaded, a notification, such as that shown at 500, can be provided to the user to inform the user of the progress of the download. In at least some embodiments, a separate dialogue can be presented prior to downloading the plug-in to ask the user whether they wish to download the plug-in. Once downloaded, the plug-in can be incorporated into the web browser to permit calling from within the web browser in a manner that preserves the user's Web browsing context.

Figure 6:
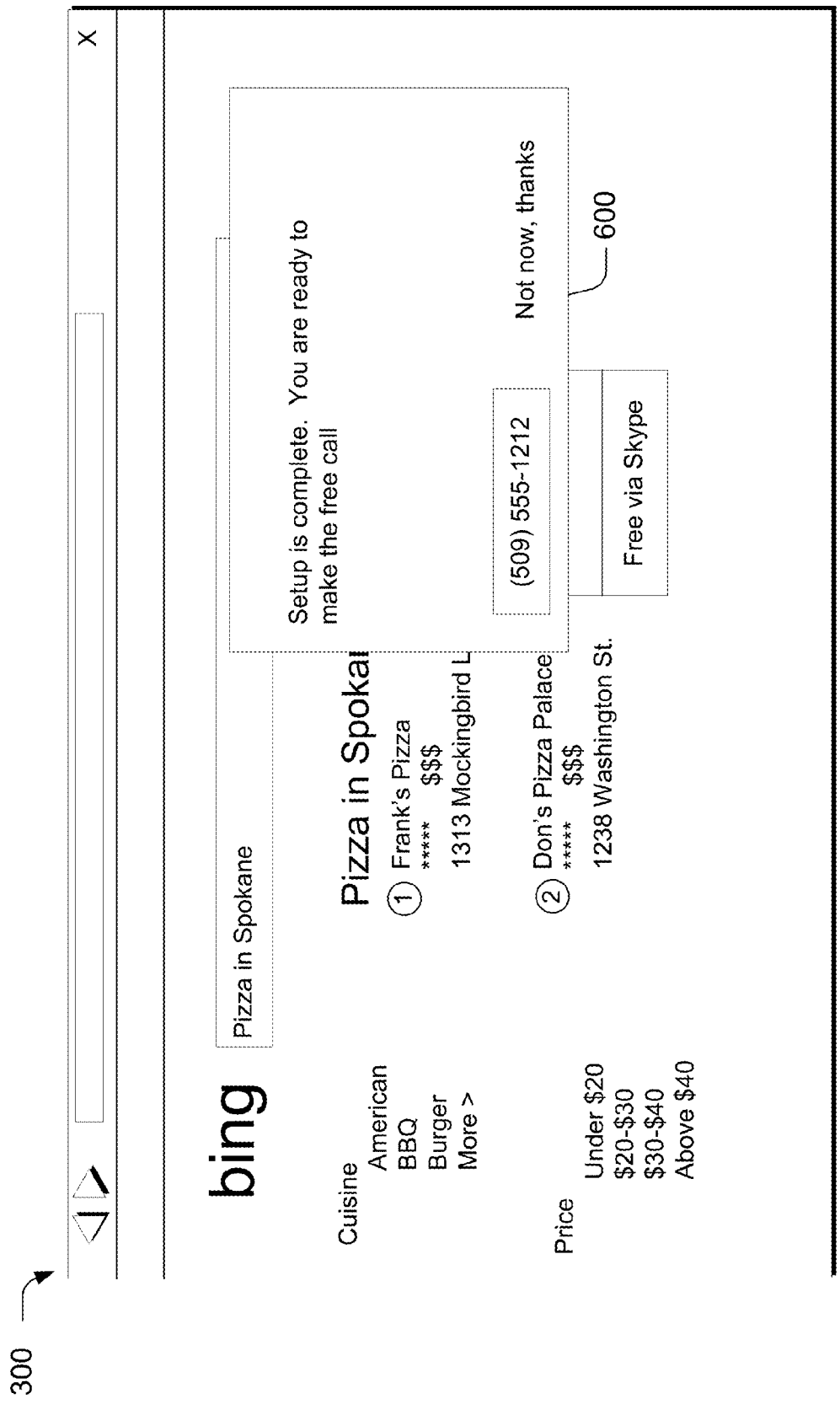
FIG. 6 illustrates an example user interface in accordance with one or more embodiments.

As an example, consider FIG. 6. There, a notification 600 is provided that gives the user an option to place the free call through their browser, as by clicking on the displayed number, or to not place the call. If the user opts to place the free call through their browser, the browser's call module 216 can place the call.

In one or more embodiments, in an event that a call attempted to be placed by a user has an associated charge assessed to the user, a notification can be provided to the user to notify them that the call carries with it a charge and giving them the option to make the call. Such notification can appear within notification 600. In this instance, the user may have an account with a P2P service, such as that offered by Skype, through which the charges can be placed and managed. Further, the notification can also provide the user with an option to increase their credit.

Further, in embodiments where the user does not have an account with a P2P service, a separate series of user interface progressions can be provided to take the user through an enrollment process.

Figure 7:
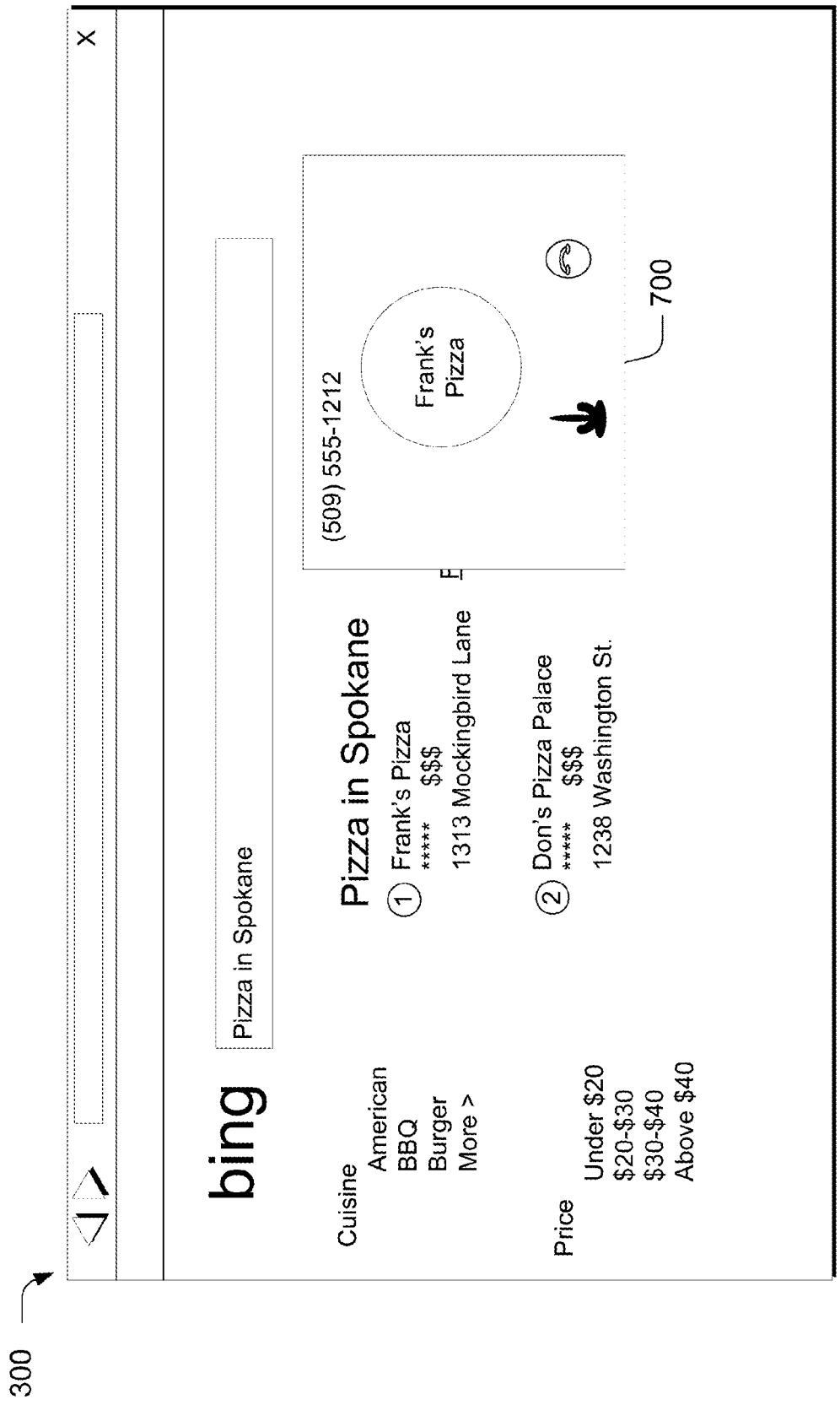
FIG. 7 illustrates an example user interface in accordance with one or more embodiments.

When the user opts to place a telephone call through their web browser, the web browser can present a user interface instrumentality that represents the telephone call. As an example, consider FIG. 7.

There, a user interface instrumentality 700 includes an icon associated with the party being called, i.e. "Frank's Pizza", an icon to end the call, and an icon to mute the microphone.

Having considered various user interface experiences in accordance with one or more embodiments, consider now an example method in accordance with one or more embodiments.

Figure 8:
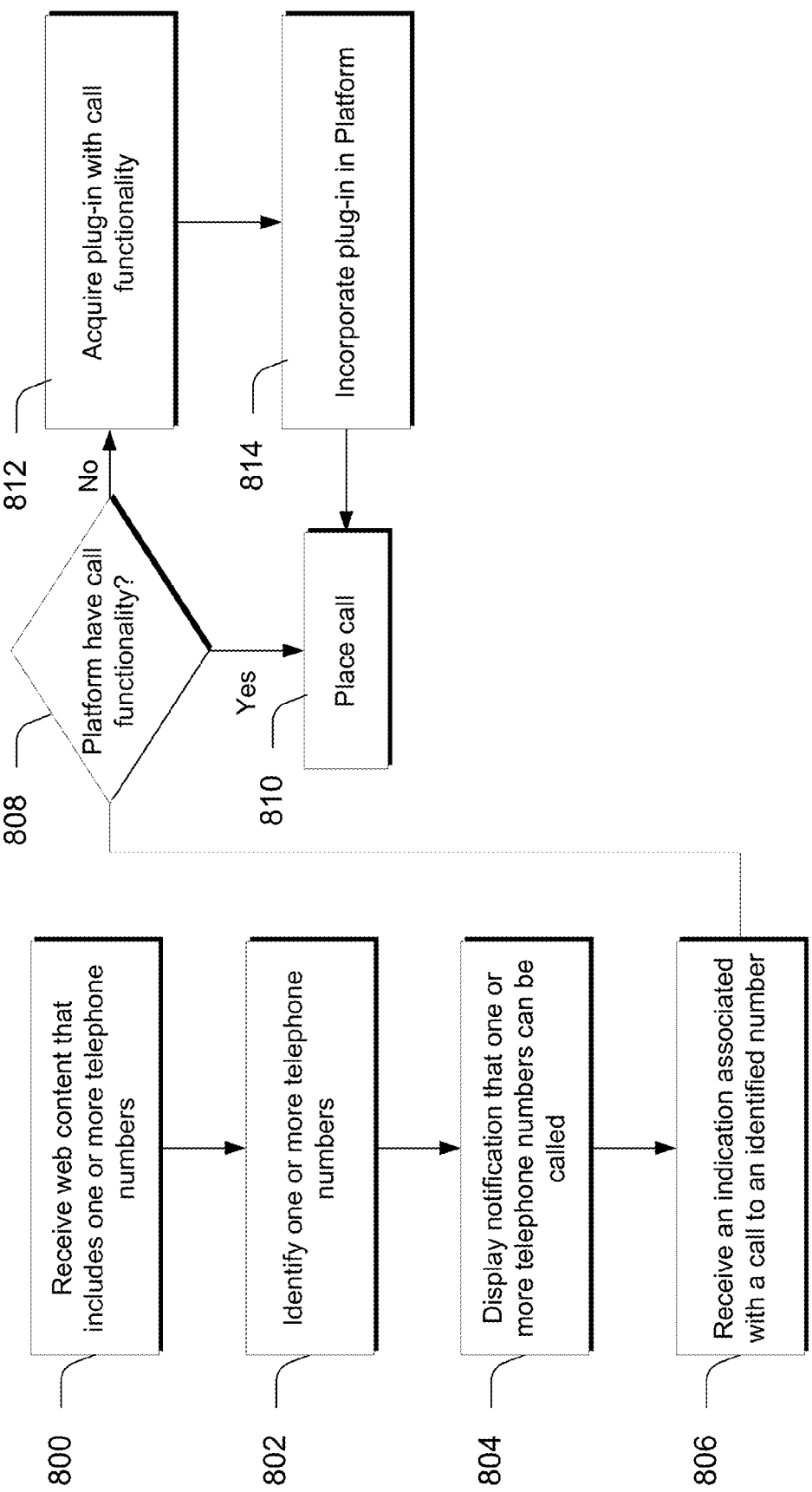
FIG. 8 is a flow diagram that describes steps in a method in accordance with one or more embodiments.

FIG. 8 is a flow diagram that describes steps in a method in accordance with one or more embodiments. The method can be performed in connection with any suitable hardware, software, firmware, or combination thereof. In at least some embodiments, the method can be performed by a suitably-configured web platform an example of which comprises a web browser.

Step 800 receives web content that includes one or more telephone numbers. The step can be performed in any suitable way. For example, web content in the form of a webpage can be received by the web browser. Step 802 identifies one or more telephone numbers that appear in the web content. This step can be performed in any suitable way, examples of which are provided above. Step 804 displays a notification that one or more telephone numbers can be called. This step can be performed in any suitable way. For example, in at least some embodiments an icon is displayed next to the telephone numbers. Alternately or additionally, notifications indicating that the various telephone numbers can be called free of charge can be displayed. Step 806 receives an indication associated with a call to an identified telephone number. This step can be performed in any suitable way. For example, in at least some embodiments an indication in the form of a mouse click can be received. Alternately or additionally, an indication in the form of a touch-selection, natural user interface (NUI) selection, stylus selection, and the like can be utilized.

Responsive to receiving the indication, step 808 ascertains whether the web platform, in this example the web browser, has call functionality. If the web platform has call functionality such that the web platform can place the call, step 810 places the call. Examples of how this can be done are provided above. If, on the other hand, the web platform does not have call functionality, step 812 acquires a plug-in with the call functionality and step 814 incorporates the plug-in in the platform. Once the plug-in is incorporated in the platform, if the user so chooses, they can elect to place their call in which case, the method returns to step 810.

Having considered an example method, consider now aspects of a call billing program in accordance with one or more embodiments.

Call Billing Program

As noted above, various entities such as businesses can participate in a call billing program in which calls that are made from a user's browser are billed to the callee and not the caller. In this manner, end users can be permitted to make free telephone calls from their web browser. In addition, enrollment in the call billing program can permit the enrollees to enjoy certain benefits. For example, companies or businesses that are enrolled in the call billing program can be prioritized higher when returning search results than those who are not enrolled in the call billing program.

Having considered an example call billing program in accordance with one or more embodiments, consider now aspects of a reverse number lookup.

Reverse Number Look Up

In at least some embodiments, details associated with the phone number that is called using the click-to-call functionality can be retrieved from a database and surfaced to the user, by way of the web platform, to enrich the user's call experience. In addition, other details that are not necessarily associated with the phone number that is being called can be surfaced to the user to enhance their experience. Further, such details are information can be provided before, during, and/or after a particular call.

With respect to providing details or information associated with the phone number that is being called, consider the following.

Figure 9:
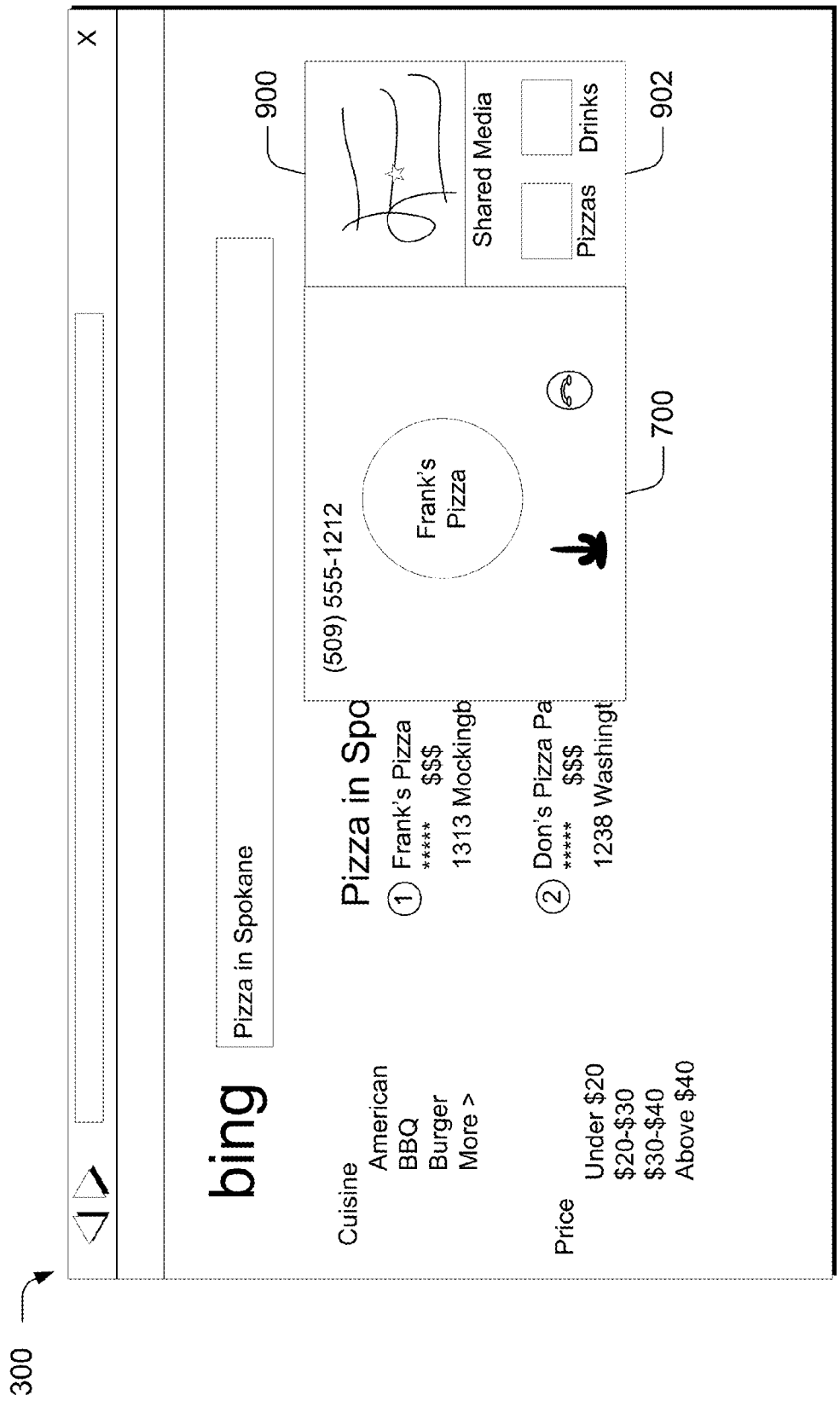
FIG. 9 illustrates an example user interface in accordance with one or more embodiments.

In some embodiments, when the user initiates a phone call from the web browser, the phone number can be used to provide additional details or information about the callee to the user. For example, a server or predefined database can maintain mappings between phone numbers and the additional details or information. When the phone number is called, the additional details or information can be surfaced to the user. Further, when the phone number is called, a reverse number lookup can be conducted to identify the entity, e.g., the business, associated with the phone number. The business name or other information associated with the business can be utilized to conduct a secondary search to retrieve additional relevant information about the business. As an example, consider FIG. 9.

There, the user is in the process of calling Frank's Pizza as indicated by the user interface instrumentality 700. Using the called number to conduct a reverse number lookup, additional details or information can be provided to enhance the user's experience. In this specific example, such details or information includes, by way of example and not limitation, a map 900 and a shared media portion 902 in which additional information about the callee can be provided. In this particular example, the shared media portion 902 allows the user to click on or otherwise select selections were they can learn more about the pizza offerings and drinks available at Frank's Pizza. Further, other information can be provided such as ratings, reviews, and the like. This can enhance the user's experience because the user can acquire additional information about the callee without having to do any additional searching or work.

In at least some embodiments, the additional information may be presented to the user in the form of a webpage to which the browser was navigated. In the present example, assume that the user calls Frank's Pizza as described above. Responsive to the call being made, the web browser can be navigated to Frank's website which can then be rendered underneath the user instrumentality 700. The additional information can also include information such as that which indicates to the user that the call is free. In this case, the information would be provided for the user actually placed a particular call.

Further, in at least some embodiments, the P2P service provider, e.g. Skype, can provide phone numbers to entities and businesses that are to be listed in advertisements. These numbers will typically be routed through the service provider's network. As such, the service provider can track information associated with the phone number and form the basis of providing rich data to the user. Such data can include, by way of example and not limitation, call duration, demographics, location, and other content.

With respect to providing details or information not necessarily associated with the phone number that is being called, consider the following.

In some embodiments, when the user starts a call, since the phone number is known, a reverse lookup can be conducted to identify other similar entities as the callee. For example, if the user opts to call Frank's Pizza, a reverse number lookup can be conducted for other pizza businesses. These other pizza businesses can be surfaced by the web browser for the user. In addition, this can be performed in connection with the call billing program described above. Specifically, when a user calls a particular number, a reverse number lookup can be conducted for other businesses or entities that participate in the call billing program. These participating businesses or entities can then be surfaced to the user along with an indication that calls to their associated phone numbers are free. This provides the user with a larger selection of entities or businesses from which to choose. In addition, it allows a user to place free calls.

Figure 10:
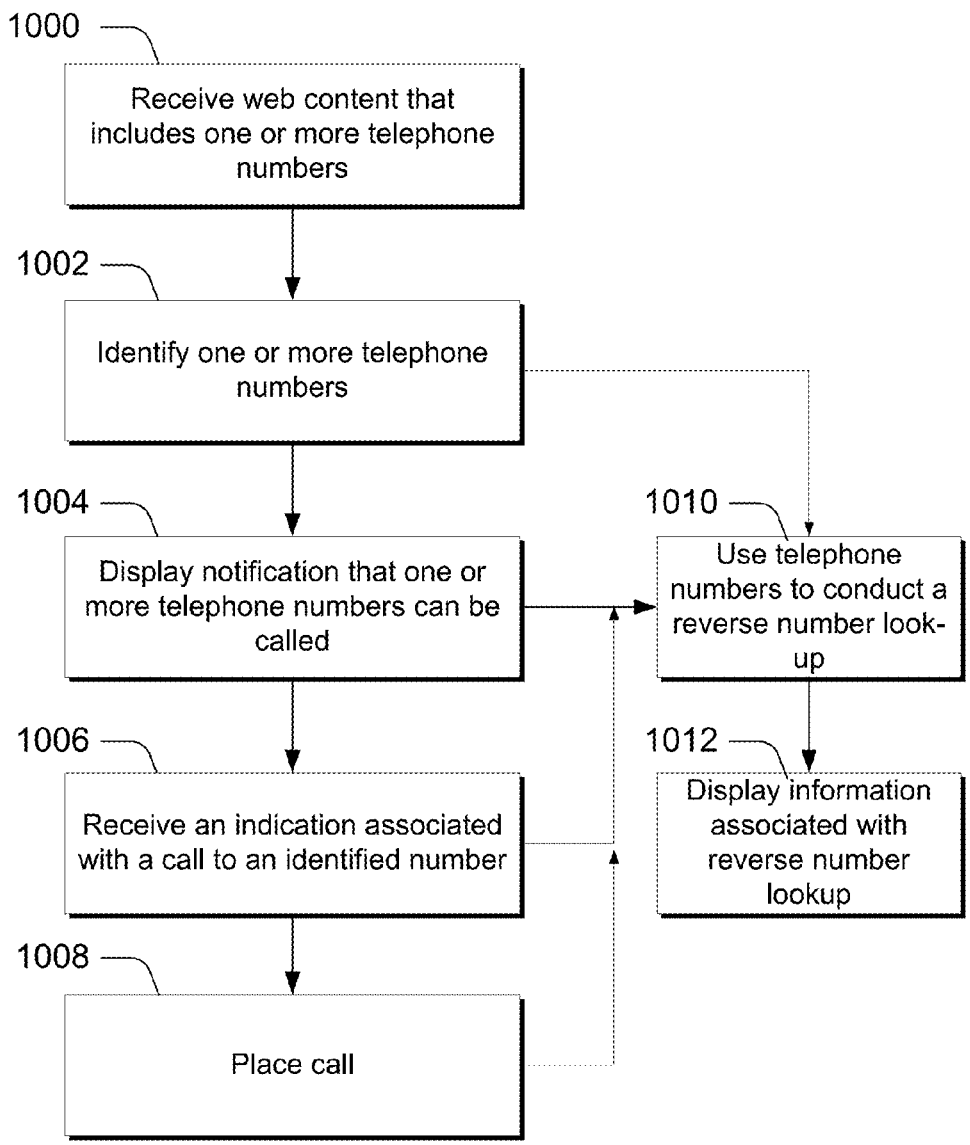
FIG. 10 is a flow diagram that describes steps in a method in accordance with one or more embodiments.

FIG. 10 is a flow diagram that describes steps in a method in accordance with one or more embodiments. The method can be performed in connection with any suitable hardware, software, firmware, or combination thereof. In at least some embodiments, the method can be performed by a suitably-configured web platform an example of which comprises a web browser. In the method about to be described, steps 1010 and 1012 are associated with conducting a reverse number lookup and displaying information associated with the reverse number lookup. The flowchart is laid out in such a way as to indicate that the reverse number lookup can occur at different points in time throughout the method. That is, the reverse number lookup can be performed at various times before a call is placed and during a particular call. Further, the reverse number lookup can be performed multiple different times during a call transaction, e.g., prior to a call being placed and during call placement.

Step 1000 receives web content that includes one or more telephone numbers. This step can be performed in any suitable way. For example, web content in the form of a webpage can be received by the web browser. Step 1002 identifies one or more telephone numbers that appear in the web content. This step can be performed in any suitable way, examples of which are provided above.

At this point, the method can branch to step 1010 which uses the telephone numbers to conduct a reverse number lookup and subsequently display, at step 1012, information associated with the reverse number lookup. In this example, the display of information takes place before the call is placed. The display of information can include, by way of example and not limitation, an indication of which calls are free or other information associated with the owner of the number.

Step 1004 displays a notification that one or more telephone numbers can be called. The step can be performed in any suitable way. For example, in at least some embodiments an icon is displayed next to the telephone numbers. Alternately or additionally, notifications indicating that the various telephone numbers can be called free of charge can be displayed.

At this point, the method can branch to step 1010 which uses the telephone numbers to conduct a reverse number lookup and subsequently display, at step 1012, information associated with the reverse number lookup. This information can be different information than that which was previously displayed after step 1002. In this example, the display of information takes place before the call is placed.

Step 1106 receives an indication associated with a call to an identified telephone number. This step can be performed in any suitable way. For example, in at least some embodiments an indication in the form of a mouse click can be received. Alternately or additionally, an indication in the form of a touch-selection, natural user interface (NUI) selection, stylus selection, and the like can be utilized.

At this point, the method can branch to step 1010 which uses the telephone numbers to conduct a reverse number lookup and subsequently display, at step 1012, information associated with the reverse number lookup. This information can be different information than that which was previously displayed after steps 1002 and 1004. In this example, the display of information takes place before the call is placed.

Step 1008 places the call. Examples of how this can be done are provided above.

At this point, the method can branch to step 1010 which uses the telephone numbers to conduct a reverse number lookup and subsequently display, at step 1012, information associated with the reverse number lookup. This information can be different information than that which was previously displayed after steps 1002, 1004 and/or 1006. In this example, the display of information takes place during the call.

Consider now various sources from which a reverse number lookup can be generated. In the examples above, a reverse number lookup was generated based upon the phone number being included in web content that is consumed by a web platform such as a web browser. A reverse number or keyword lookup can also be generated through content that is processed by a P2P client application such as that described above, a chat client, an e-mail client and the like. Specifically, assume that a user, operating their chat client, types in "do you want to eat pizza tonight?" The chat client software can identify the key word "pizza", highlight it, and give the user options of merchants that they can call for free. The options can be displayed within the chat client or application from which the content was obtained. Alternately or additionally, a web browser can be launched and the keyword utilized for a search that returns search results such as those described above. In this manner, keywords obtained in an application that is different from a web browser can be utilized to automatically launch a web browser or otherwise cause the keywords to be used by the web browser to provide search results with individual phone numbers that can be called for free from within the web browser.

Having considered various embodiments, consider now an example system that can be utilized to implement the embodiments described above.

Example System

Figure 11:
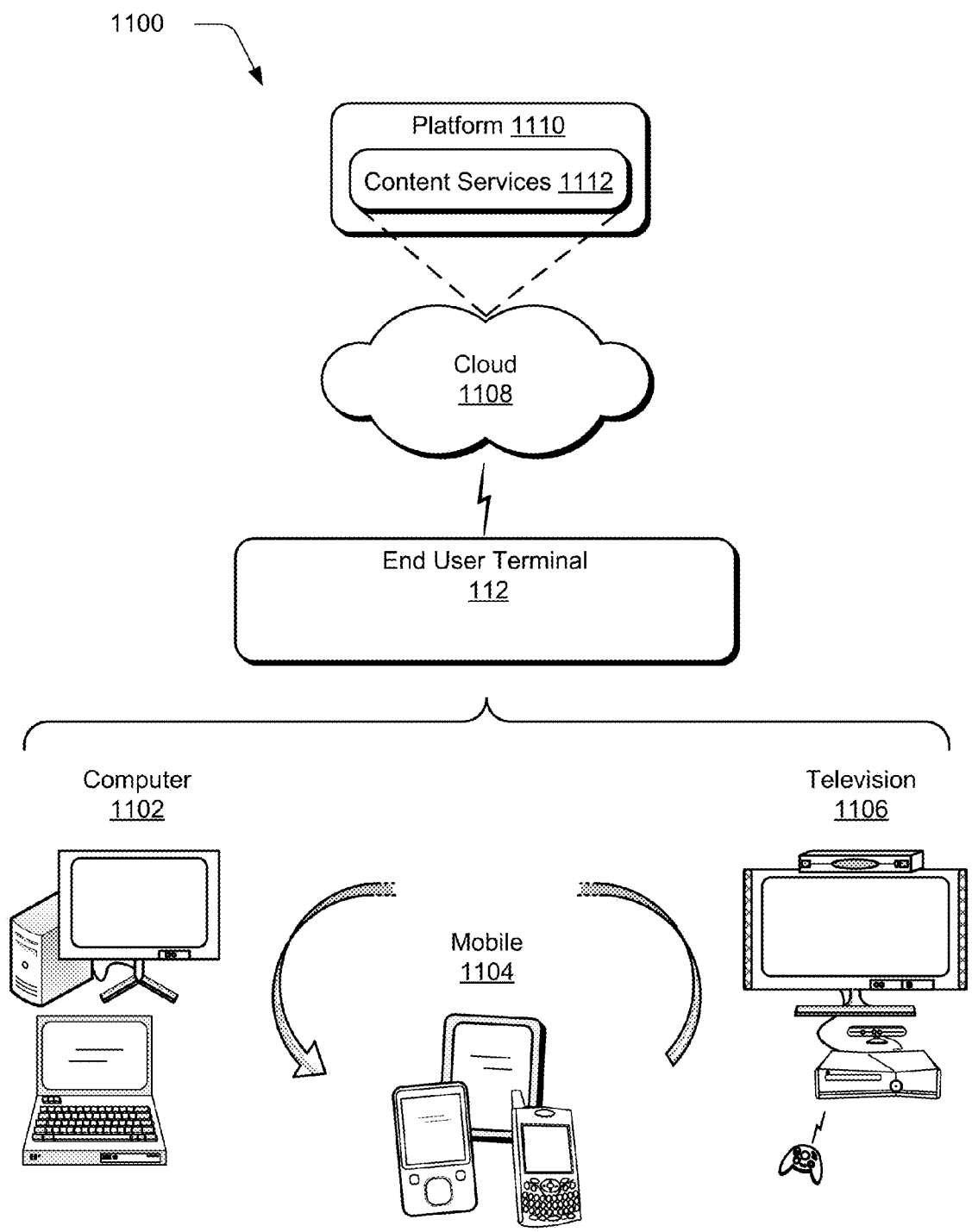
FIG. 11 illustrates an example system that includes the various end user terminals as described with reference to FIG. 1.

FIG. 11 illustrates an example system 1100 that includes the end user terminal 102 as described with reference to FIG. 1. The example system 1100 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1100, multiple devices are interconnected through a central computing device. The central computing device may be local to the multiple devices or may be located remotely from the multiple devices. In one embodiment, the central computing device may be a cloud of one or more server computers that implement a service provider and/or charging gateway, as described above. These computers can be connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the end user terminal 102 may assume a variety of different configurations, such as for computer 1102, mobile 1104, and television 1106 uses. Each of these configurations includes devices that may have generally different constructs and capabilities, and thus the end user terminal 102 may be configured according to one or more of the different device classes. For instance, the end user terminal 102 may be implemented as the computer 1102 class of a device that includes a personal computer, desktop computer, a multi-screen computer, laptop computer, netbook, and so on. Each of these different configurations may employ the techniques described herein, through a suitably-configured client application which can serve to enable a user to make calls and/or participate in other communication sessions, as described above.

The end user terminal 102 may also be implemented as the mobile 1104 class of device that includes mobile devices, such as a mobile phone, portable music player, portable gaming device, a tablet computer, a multi-screen computer, and so on. The end user terminal 102 may also be implemented as the television 1106 class of device that includes devices having or connected to generally larger screens in casual viewing environments. These devices include televisions, set-top boxes, gaming consoles, and so on. The techniques described herein may be supported by these various configurations of the end user terminal 102 and are not limited to the specific examples the techniques described herein.

The cloud 1108 includes and/or is representative of a platform 1110 for content services 1112. The platform 1110 abstracts underlying functionality of hardware (e.g., servers) and software resources of the cloud 1108. The content services 1112 may include applications and/or data that can be utilized while computer processing is executed on servers that are remote from the end user terminal 102. Content services 1112 can be provided as a service over the Internet and/or through a subscriber network, such as a cellular or Wi-Fi network.

The platform 1110 may abstract resources and functions to connect the end user terminal 102 with other computing devices. The platform 1110 may also serve to abstract scaling of resources to provide a corresponding level of scale to encountered demand for the content services 1112 that are implemented via the platform 1110. Accordingly, in an interconnected device embodiment, implementation of functionality described herein may be distributed throughout the system 1100. For example, the functionality may be implemented in part on the end user terminal 102 as well as via the platform 1110 that abstracts the functionality of the cloud 1108.

CONCLUSION

Various embodiments provide a subscription management service, which can be in-band or out-of-band, which allows users to extend their subscription or temporarily side-step payment limits on a subscription without disrupting the user's experience. The various embodiments can be operable in all on-demand services including, but not limited to, video services, voice services, video/voice services, text services, Web services, and the like.

Although the embodiments have been described in language specific to structural features and/or methodological acts, it is to be understood that the various embodiments defined in the appended claims are not necessarily limited to the specific features or acts described. Rather, the specific features and acts are disclosed as example forms of implementing the various embodiments.

What is claimed is:

1. A computer-implemented method comprising:
receiving, with a web platform at an end-user terminal, web content that includes one or more telephone numbers;
identifying one or more telephone numbers that appear in the web content;
displaying a notification that the one or more telephone numbers can be called from the web platform;
receiving an indication of a user selection to place a call to an identified telephone number;
responsive to receiving the indication of the user selection, ascertaining whether the web platform includes call functionality to make the call to the identified telephone number from the web platform of the end-user terminal;
responsive to the receiving the indication of the user selection and the web platform not including the call functionality, downloading a plug-in that embodies the call functionality; and
responsive to said downloading the plug-in, placing the call using the web platform of the end-user terminal and via the call functionality provided by the plug-in.

2. The computer-implemented method of claim 1, wherein said displaying comprises displaying an icon next to the one or more telephone numbers.

3. The computer-implemented method of claim 1, wherein said receiving an indication comprises receiving a mouse click.

4. The computer-implemented method of claim 1, wherein said receiving an indication comprises receiving an input other than a mouse click.

5. The computer-implemented method of claim 4, wherein the other input is one of: a touch-selection, a natural user interface (NUI) selection, or a stylus selection.

6. The computer-implemented method of claim 1 further comprising prior to said placing, and responsive to the receiving the indication of the user selection and the downloading the plug-in, instantiating the call functionality in the web platform and via the plug-in.

7. The computer-implemented method of claim 1, wherein the web platform comprises a web browser.

8. One or more computer readable storage memory devices of an end-user terminal comprising computer-executable instructions which, when executed, implement a web platform configured to perform operations comprising:
receiving web content, at the end-user terminal, that includes one or more telephone numbers;
identifying one or more telephone numbers that appear in the web content;
displaying a notification that one or more telephone numbers can be called from the web platform;
receiving an indication of a user selection to place a call to an identified telephone number;
responsive to receiving the indication of the user selection, ascertaining whether the web platform includes call functionality to place a call to the identified telephone number from the web platform of the end-user terminal;
responsive to the receiving the indication of the user selection and the web platform not including the call functionality, downloading a plug-in that embodies the call functionality; and
responsive to said downloading the plug-in, placing the call using the web platform of the end-user terminal and via the call functionality provided by the plug-in.

9. The one or more computer readable storage memory devices of claim 8, wherein said displaying comprises displaying an icon next to the one or more telephone numbers.

10. The one or more computer readable memory devices of claim 8, wherein said receiving an indication comprises receiving a mouse click.

11. The one or more computer readable memory devices of claim 8, wherein the web platform comprises a web browser.

12. The one or more computer readable storage memory devices of claim 8, wherein said receiving an indication comprises receiving an input other than a mouse click.

13. A user terminal comprising:
one or more processors;
one or more computer readable storage media;
a web platform embodied on the one or more computer-readable storage media of the user terminal and configured to implement a method comprising:
receiving web content that includes one or more telephone numbers;
identifying one or more telephone numbers that appear in the web content;
displaying a notification that one or more telephone numbers can be called from the web platform;
receiving an indication of a user selection to place a call to an identified telephone number;
responsive to receiving the indication of the user selection, ascertaining whether the web platform includes call functionality to make the call to the identified telephone number from the web platform of the user terminal;

responsive to the receiving the indication of the user selection and the web platform not including the call functionality, downloading a plug-in that embodies the call functionality; and responsive to said downloading the plug-in, placing the call using the web platform of the user terminal and via the call functionality provided by the plug-in.

14. The user terminal of claim 13, wherein said displaying comprises displaying an icon next to the one or more telephone numbers.

15. The end user terminal of claim 13, wherein said receiving an indication comprises receiving a mouse click.

16. The user terminal of claim 13, wherein said receiving an indication comprises receiving an input other than a mouse click.

17. The user terminal of claim 16, wherein the other input is one of: a touch-selection, a natural user interface (NUI) selection, or a stylus selection.

18. The user terminal of claim 13 further comprising prior to said placing, and responsive to the receiving the indication of the user selection and the downloading the plug-in, instantiating the call functionality in the web platform and via the plug-in.

19. The user terminal of claim 13, wherein the web platform comprises a web browser.

20. The one or more computer readable memory devices of claim 8, the instructions further executable to perform operations comprising:

prior to said placing, and responsive to the receiving the indication of the user selection and the downloading the plug-in, instantiating the call functionality in the web platform and via the plug-in.

\* \* \* \* \*